Dec. 24, 1963  W. R. BRYANT  3,114,938
METHOD OF CONTROLLING MOISTURE CONTENT IN COTTON PROCESSING
Filed Feb. 23, 1961
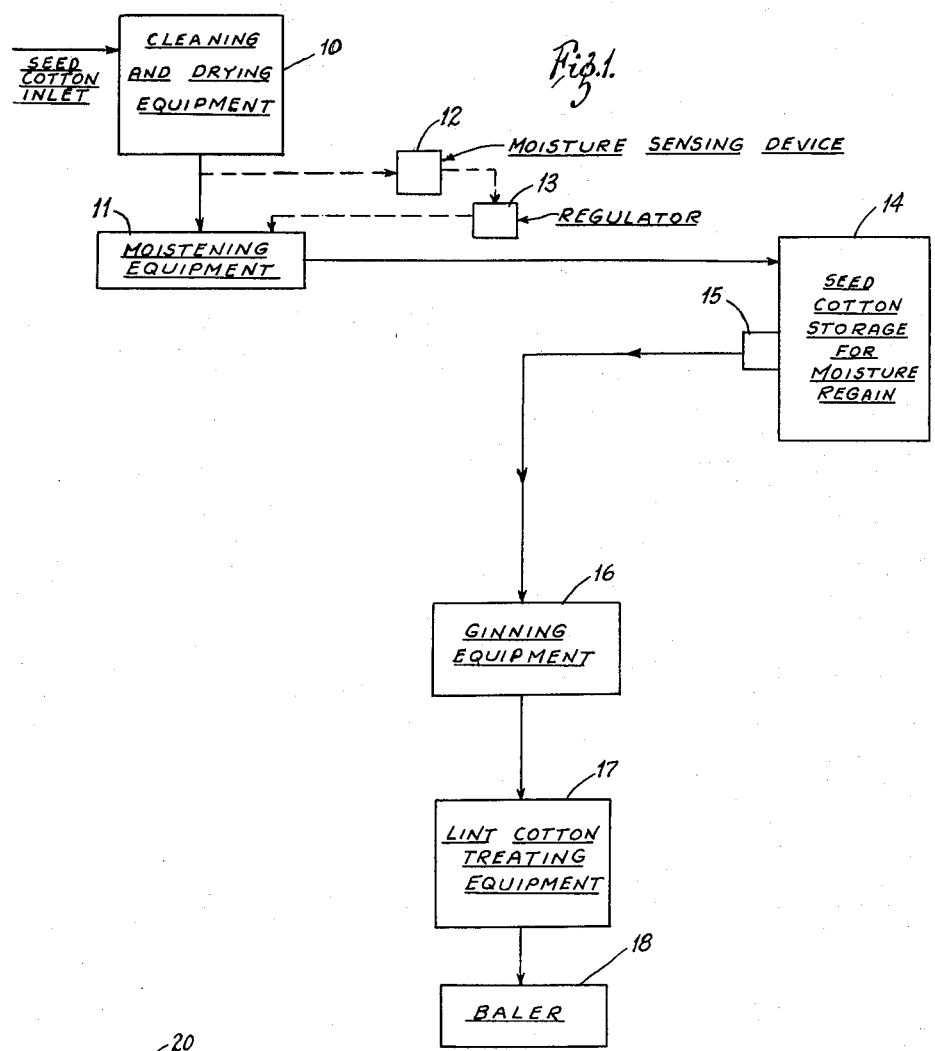
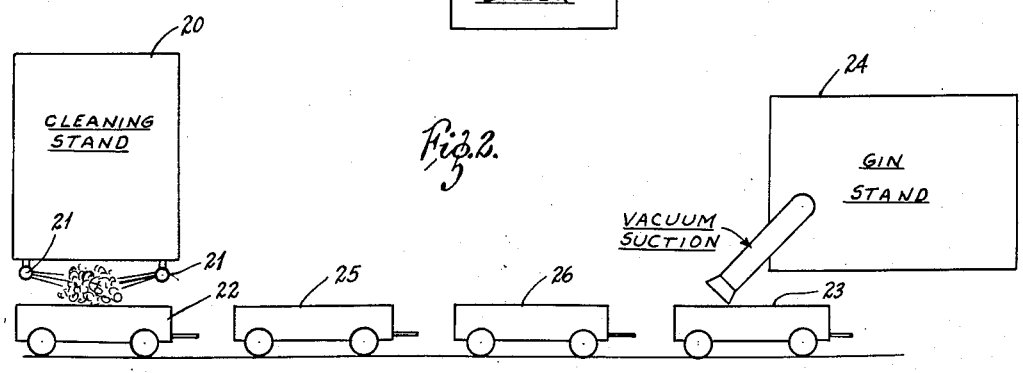
INVENTOR:
WILLIAM R. BRYANT,
BY Kingsland, Rogers & Ezell
ATTORNEYS

United States Patent Office 3,114,938
Patented Dec. 24, 1963

3,114,938
METHOD OF CONTROLLING MOISTURE CONTENT IN COTTON PROCESSING
William R. Bryant, 828 Strawn St., Jonesboro, Ark.
Filed Feb. 23, 1961, Ser. No. 91,165
6 Claims. (Cl. 19—66)

This invention relates to the cotton processing art and particularly to the effective regulation of moisture contents in the cleaning and in the ginning of cotton.

The present invention involves a system of moisture regulation in cotton being cleaned and then ginned, wherein the cotton is dried to provide a low moisture content during cleaning, then is moistened, and held in confinement during a moisture absorption period sufficiently long to enable the moisture to be absorbed throughout the cotton fibers and to provide an adequately high moisture content through the fibers during ginning, and thereafter is ginned to remove the seeds, with further lint cleaning if needed. The time for confinement of the cotton may be from a few minutes to much longer, but it has been found that twenty to thirty minutes is optimum. The reestablished moisture content remains throughout the rest of the processing and baling of the cotton.

To explain in greater detail, modern cotton processing at the gin plant involves the two fundamental stages of operation: the cleaning stage and the ginning stage. For the cleaning stage, various cleaning machines have been used, all of which are intended to remove sticks, stems, hulls, leaf trash, sand, dirt and other extraneous matter, always present to a greater or lesser extent in the seed cotton as it comes from the field. These cleaners can involve (1) rotating, vaned or spiked cylinders cooperating with screens for the removal of smaller extraneous matter; or (2) saw cylinders cooperating with grid bars or with kicker rollers for the removal of the larger extraneous matter.

The ginning stage involves the use of gins or gin stands which remove the lint from the seed by means of revolving saw cylinders cooperating with ribs.

For at least seventy-five or one hundred years, it has been known that, for optimum cleaning results, the moisture content of the cotton must be at one level, whereas for optimum ginning, the moisture content of the cotton must be at a higher level.

The ideal moisture content of the cotton for cleaning purposes falls within the range from 4% to 6%. The ideal moisture content of the cotton for ginning purposes falls within the range from 6% to 8%.

If the cotton is wetter than 6% when it goes through the cleaners, the affinity of the cotton fibers for the leaf trash and other small extraneous matter is much greater than when the moisture content is between 4% and 6%; also the hulls and other large extraneous matter are more flabby. In either case, the removal of the foreign matter is adversely affected. The wetter the cotton above 6%, the worse the cleaning results. Also, when the cotton contains excessive moisture there is a strong likelihood of congestion and clogging in the cleaners, sometimes resulting in choking the flow of cotton and causing a shutdown of the entire plant; this is very objectionable.

On the other hand, if the cotton does not contain at least 6% moisture, it will not gin properly. Cotton fibers that are drier than 6% are likely to become brittle, with a considerable percentage of them actually breaking during the ginning operation or later at the cotton mill as the lint is spun into thread. These broken fibers in the cotton sample greatly penalize the value of the lint, causing the owner of the lint a serious loss when he goes to market with it. If the fibers are too brittle, the cotton buyers, anticipating a further breakage trouble at the cotton mill, will heavily discount the price. In either case, the ginning of excessively dried cotton causes a serious economical loss.

Furthermore, it has been found that when cotton is sufficiently dried by artificial means to enable it to be cleaned properly, there often results a contraction or shortening of all of the fibers. This also penalizes the value of the lint, because, all other things being equal, the longer the fibers, the more valuable the cotton.

Now, it has been obvious for many years that the scientific method of dealing with the moisture problem in a cotton gin plant is to dry the cotton by using heated air to the point where the moisture content is sufficiently reduced to permit optimum cleaning; and then after the cleaning operation, or at least the greater part of the cleaning operation, has been completed, to restore sufficient moisture to the cotton to bring the level up to within the range of 6% to 8% in order to effect optimum ginning.

It is comparatively easy to do the necessary drying of cotton as it flows through the equipment in the gin plant ahead of the main cleaning machinery. However, the difficulty has come in attempts to effectively add moisture after the cleaning operation and before the ginning operation. While moisture has been added to the stream of cotton before it goes to the gin, this has proven inadequate to overcome the effects of the dryness produced theretofore for the cleaning. This inventor has found that the reason for this difficulty is that a certain period of time is required to effect the proper absorption of the moisture by the fibers. This period of time must be at least five minutes and preferably is twenty-five to thirty minutes. Yet it is impractical to stop the cotton stream for this length of time to permit the absorpion to take place. In a modern gin plant, with a capacity of fifteen to twenty bales per hour, it is extremely important to keep the cotton flowing to and through the gin stands and through the equipment that follows, at the maximum rate. If the cotton coming to the gin stands is delayed, by reason of a humidifying process or for any other reason whatever, the ginner suffers a considerable loss. If the delay is too long, scores of customers with truckloads of cotton waiting in the yard for their turn, are likely to become impatient and to take their cotton to a competitive gin. Frequent choke-ups or slowdowns at the height of the season are unforgivable sins, because the season generally does not last more than three or four months.

Therefore, the insurmountable problem heretofore has been how to get the fibers of the cotton to absorb sufficient moisture to effect optimum ginning conditions— which, as stated, requires from five to twenty-five or thirty minutes for the necessary absorption process— without causing any delay in the feeding of the cotton to the gin stands. On the other hand, my invention presents a method and apparatus for processing cotton that have been completely successful in this regard. The process involves cleaning the cotton at the optimum moisture level for the most effective performance of the cleaning machine, which moisture level is generally in the range of 4%–4½%. At its highest, this moisture level should not exceed 5%–6%.

Then after the cotton is cleaned, or just prior to the final cleaning stages, moisture is added to the cotton. Thereafter, the cotton is directed to a storage container where it is stored for a sufficient period of time to allow absorption of the moisture in the cellular structure of the fibers. Preferably, this absorption period falls within the range of twenty or thirty minutes. The moisturizing and absorption storage produce a moisture content in the range of 7%–7½% within the fibers. An important feature of the invention is that the storage arrangement provides enough capacity to enable the cotton to remain in storage for the required moisture regain period, although the overall flow of cotton in the cleaning and ginning system is not delayed.

After the period of storage, the cotton is fed into the gin stand where the fibers are removed from the seeds, and the fibers are ultimately baled. The moisture content established by the regain step remains with the cotton throughout the remainder of the process. The cotton is far superior to conventionally processed cotton, as will be explained.

Although the former processes actually added moisture to the cotton, what has been confounding to others active in this art, has been the failure of spraying of moisture onto the cleaned cotton to improve the brittleness and short fiber content of the cotton processed by the gin stand. This confusion is compounded because, although galvanometer measurements of the cotton thus moistened indicate the presence of a proper moisture content, nevertheless, when such cotton is sent through the gin, the short and brittle fibers result. What has not been appreciated is that this spraying of the moisture onto the cotton does not result in the absorption by the fibers of the moisture. Consequently, the moisture or most of it, is immediately flung away by the rapid rotating action of the gin saws. What little moisture remains with the cotton is carried only upon the surface of the cotton fibers and does not materially affect the brittleness of the cellulose center. Accordingly, although the meter readings of the cotton so sprayed indicate a proper moisture content (and these meter readings are inaccurate to the extent of indicating whether the moisture measured is surface moisture or absorbed moisture), the cotton ginned is of nearly the same inferior quality as it would be if no moisture were added at all. The efforts to improve the moisture condition of the cotton have not gone further. An obstacle has been the principle, adhered to by all, that the cotton cleaning and ginning machinery must not be interrupted in their continuous operation, together with the thought that any interruption in the convenional flow path of the cotton would necessarily require an interruption in the operation of the cleaner or gin stand.

The importance of eliminating short fibers from the ginned cotton should not be minimized. In the first place, the cotton is given an inferior rating in proportion to the percentage of short fibers. These short fibers are a primary cause of "ends down," which is the snapping of thread in the spinning process.

Processed cotton is also hand classed. One test of the quality of the cotton is to determine by hand pull its drag or resistance to separation from adjacent fibers. When the fibers are dry and brittle, they exhibit little drag. By contrast, properly moistened cotton has more life to it and offers a greater resistance or drag.

Another beneficial result in the processing of the moistened cotton has been the greater effectiveness of the lint cleaners. These are the cleaning devices for removing trash from the ginned fibers. The lint cleaners are necessary because, under the operating principles of the main cleaning machine whereby the sticks and trash are slung away from the cotton under the influence of centrifugal forces of rotation, that trash having the same or lower values of specific gravity remains with the cotton. The removal of this trash after moisturizing is improved in the lint cleaners because the moisturizing increases the specific gravity of the trash that was not theretofore removed.

A very important effect of the moisturizing process of this invention is in the expulsion of immature seeds during the ginning process. Conventionally, a detrimental number of these small seeds remain with the fibers after separation from the matured seeds. The precise reason for the absence of the immature seeds in the fibers processed with this invention is not known, but the probable explanation is that these seeds become saturated with water, raising their specific gravity, and are more readily removed by the lint cleaners.

It is apparent that the present process, which effectively moistens the cotton fibers, causes increased efficiency of the gin stand. There is faster separation of the fibers from the seeds. There is more rapid doffing of the cotton from the gin saws. And what is more, no heating in the gin stand is required. All of these facts not only result in faster and more economical operation of the cotton gin, but also reduce the stresses imparted to the cotton that cause its deterioration and produce short fibers. Of even further significance is the fact that these results are enhanced with the processing of relatively finer grade cotton, an important consideration inasmuch as a high percentage of today's cotton product is of this variety.

The cotton ginned under the process of this invention will press into a bale and tie up better than conventionally ginned cotton. Furthermore, all the bales are homogeneous in quality because the handling of the cotton for the storage step of the process mixes it up. Consequently, there are no bales having one large portion of cotton in one condition and another large portion of cotton in another condition, such as often happens with the conventional processing of a batch of cotton, part of which was picked in the early, damp morning, and the rest picked later.

This process greatly reduces losses caused by fires. In the present state of the art, fires break out periodically, usually in the overhead cleaning machinery. In the conventional, rapid stream flow of cotton directly from the cleaner to and through the gin stand, thence to the press for baling, there is no stopping the smoldering cotton. Many times the smoldering cotton is baled with fire not then visible, only to erupt in a transport truck or in storage with the resultant burning of all the bales nearby.

Because the storage step in this process includes isolating the cotton for a period of time, with handling of the cotton during the process, any fires that occur in the cleaning machine are then isolated. While these fires may burn the cotton thus isolated, they are not transmitted to the rest of the cotton, and because the fire is not quickly hidden in a bale, it is readily noticeable and can be taken care of at the gin plant.

Still another important effect of the process of this invention is the restoration of the normal moisture content of the cotton at the farming citus and, therefore, its normal weight. This effect is particularly important in farming areas of dry atmospheric climate. In those areas, the cotton that is ginned in conventional steps, without the moisture regain of this invention, is sold by the farmer. Since the weight is low, the price paid is low. The cotton is then shipped for spinning to another geographical area where, because of normal humidity conditions, it regains moisture and weight. Therefore, with conventional ginning practice, the price paid the farmer for his cotton, as measured by the weight of the cotton, may be actually lower than the true value of the cotton.

Under the moisture regain process of this invention, the moisture content is restored to the cotton before it is ginned. Because the moisture is absorbed by the cellular structure of the fibers, it is retained and results in cotton of normal weight at the time of sale by the farmer.

It should now be noted that, in spite of the interrupted flow of cotton for storage to allow moisture absorption, the cleaning machines and gin stands operate continuously once the cycle is in operation. The only delay caused by the storage step is in the start-up operation whereby the gin stand remains idle after the cleaning operation has begun, during the period of storage of the initially cleaned cotton. Thereafter, when the first of the cleaned cotton has absorbed sufficient moisture and is fed to the gin stand, a cycle of continuous operation prevails, including cleaning, moisturizing, moisture absorbing and ginning.

Furthermore, once the cycle is operating, the storage step may actually save time in allowing the cleaning machines and gin stands to operate continuously under conditions where some interruption would heretofore have occurred. There are periodic variations in the relative operating rates of these stands, caused either by variations in the field condition of the cotton, such as the presence of more or less trash, or by variations in the ginning time for different cotton batches. These variations in operating time can be absorbed by the flexibility of the cotton storage step.

The foregoing advantages and effects of the invention constitute the general objects. Specifically, the objects of the invention include the provision of a method and apparatus for processing cotton that provides optimum moisture contents in both the cleaning and ginning operations; that reduces the brittleness in the fibers of processed cotton; that eliminates or reduces the number of short fibers in the processed cotton; that raises the grade and quality of the cotton; that restores the natural moisture content of the processed cotton; that increases the efficiency of the gin stand; that increases the efficiency of the lint cleaner; that isolates fires; that produces homogeneous cotton bales; that removes most or all of the immature seeds; that reduces the number of ends-down during spinning; and that performs all of these objects while permitting the cleaning and ginning stands to operate continuously and uninterrupted.

In the drawings:

FIGURE 1 is a diagrammatic flow chart of the cotton processing system of this invention; and FIGURE 2 is a diagrammatic example of a manner of practicing the invention.

Referring now to the drawings, the seed cotton from the field is fed to a cleaning machine, represented by the cleaning and drying equipment 10. By this equipment, the cotton is subjected to blower drying, with heated air if necessary, to reduce its moisture content to about 4% to 4½%, and to cleaning to remove the sticks, hulls and trash preparatory to ginning the cotton. Whereas in conventional cotton processing, the cotton next would be fed directly to the cotton gin, under this invention it is subjected to the moisturizing process that has been generally described.

The moisturizing process first involves the spraying of water onto the cleaned cotton, or nearly cleaned cotton. This is done by the moisturizing equipment 11. Any form of moisturizing equipment 11 may be used, and a simple array of water pipes, each having a plurality of spray outlets, is suitable.

If automatic control is desired, a moisture sensing device 12 and a regulator 13 may be provided. The moisture sensing device 12 measures the moisture content of the dried cotton before it passes the moisturizing equipment 11. The device then controls the regulator 13, which in turn regulates the flow of water from the moistening equipment. The regulator 13 may be any suitable form of water valve.

After the cotton has received moisture from the moistening equipment 11, it is directed to a storage station 14 for absorption of the moisture into the cellular structure of the fibers. The storage station 14 may take any of a variety of forms, but it is preferable to provide such storage as will provide separation of the cotton into single bale volumes.

The optimum storage time for the cotton after moistening and before ginning is about twenty to thirty minutes. Such a period of time allows the moisture sprayed onto the cotton fibers to be absorbed into the cellular structure. Each cotton fiber is porous and has a cellulose lined opening or hole through its center. Unless the pores and the hole absorb the moisture, it remains surface moisture and does not affect the part of the fiber that actually determines its quality. Furthermore, with the whirling of the gin saws in the cotton gin, surface moisture will quickly be thrown off the fibers, and most of the ginning will take place upon dry cotton.

When adequate time is allowed for storage of the moistened cotton, an amount of moisture is absorbed to raise the moisture content to about 7% to 7½%. While about twenty-five minutes, or other time within the range of twenty to thirty minutes is sufficient for an optimum amount of absorption (much longer storage times are permissible, but generally unnecessary), even a short storage time of about five minutes produces beneficial results. In that short time some of the moisture can be absorbed. But the conventional attempts to spray moisture onto the cotton as it passes rapidly from the cleaning machine to the gin stand definitely do not permit measurable absorption because the total time after moisturizing is then a matter of a few seconds.

At the end of the storage period, the cotton may be fed directly to the gin stand or it may be subjected to an air blast from a blower 15 to remove the excess, unabsorbed surface moisture. When the cotton is introduced into the cotton gin 16, it retains its moisture because of the storage step of the process.

From the cotton gin 16, the cotton is fed through any lint treating apparatus 17, such as lint cleaners, and it is finally baled by the baler 18. During the entire ginning operation, the moisture content remains stable even though any remnant surface moisture is slung away by the centrifugal action of the ginning equipment. And the moisture remains with the cotton after it is baled.

Although the most satisfactory performance of this invention is to effect the moistening operation after the seed cotton has completed its passage through the cleaning and drying equipment, it will be understood that in some instances this moistening operation may be effected, at least in part, during various steps of the cleaning and drying operations. In any event, however, sufficient additional moisture is applied to the seed cotton fibers so that when the cleaning and drying operations are completed, there is adequate moisture applied to the surfaces of the fibers for absorption into the cellular structure of the seeds.

It should be noted that cotton is never completely cleaned in a ginning plant. Even after the lint cotton is baled, it is subsequently subjected to further cleaning operations in the textile plant. However, it is cutomary to clean the cotton in the cleaning and drying equipment as much as possible by the capabilities of such equipment.

Furthermore, in the drying and cleaning, some foreign matter achieves a specific gravity comparable to that of the seed cotton fibers and is difficult to remove. The moistening operation also effects moisture regain of the foreign matter, while dissipating static charges, and restores the weight differentiation between the foreign matter and the fibers. Thereafter, additional cleaning steps will be effective in expelling at least most of this remaining foreign matter.

FIGURE 2 illustrates an example of one means for carrying out the process of this invention. In this example, the cotton is dried and cleaned in a cleaning machine 20 that is in continuous operation. As the cotton is expelled from the cleaning machine 20 it is moistened by water spray from a plurality of water pipes 21, each having a number of water outlets for directing the water spray over the entire area of the cleaning machine outlet. The cotton thus moistened falls into a wagon 22.

The wagon 22 continues to receive cotton from the cleaning stand 20 until at least enough cotton for a full bale has piled up in the wagon. The wagon 22 is then driven to a position out of the way of the cleaning machine and the gin stand, and kept out of the way for about twenty-five minutes for absorption of the added moisture.

While the wagon 22 is receiving cotton from the cleaning machine 20, another wagon 23 is delivering cotton to a gin stand 24 for separation of the fibers from the seeds. The wagon 23 is one that has held cleaned and moistened cotton in storage for the full absorption period.

Another wagon 25 received cotton just prior to the wagon 22, and the wagon 26 received cotton just prior to the wagon 25. A sufficient number of such wagons are provided so that the cleaning machines and gin stands can operate continuously and so that each wagon is allowed the full storage time. For example, considering a storage time of thirty minutes, a six bale per hour capacity of the cleaning machines and gin stands, and a load per wagon of cotton sufficient for one bale, four wagons would be required. The extra wagon is to allow for loading and unloading time. One or two additional wagons may be used to absorb periodic variations in the relative operating rates of the cleaning and gin stands to assure continuous operation of both stands.

These wagons may be open or closed. A closed confinement for storage of the moistened cotton has the advantage of reduced evaporation to atmosphere. Open storage, however, is reasonably satisfactory in that the cotton within the pile is shielded from the atmosphere, and even the cotton on the surface of the pile can absorb a large amount of moisture before complete evaporation can take place.

It is within the purview of this invention to employ any type of storage of the moisture coated seed cotton fibers. The fibers may be retained in a stationary condition or in dead or immobile storage; or may be retained in a continuously moving condition or in a live or mobile storage for the desired period of time.

Experiment has shown that, if moisture is applied to the exterior surface of a mass of seed cotton fibers, and such fibers are then piled and stored in layers and masses, that the surface moisture will be eventually absorbed into the cellular structure of the fibers and into the seeds. In other words, storage of the cotton in piles reduces the access of the fibers to atmosphere.

Under other storage methods, the fibers may be subjected to agitation or to currents of moist and/or heated air for the purpose of securing a more uniform application of the surface moisture over all of the surface of the individual fibers and thus effect a more rapid penetration of the moisture into the internal or cellular structure of the fibers and into the cotton seeds.

Still other storage methods include conveyor systems upon which a layer or layers of seed cotton are continuously transported about the interior of the storage chamber or chambers for the sufficient length of time to effect the desired moisture regain and content in the cellular structure of the fibers and seeds. This action may be accompanied by circulation of moistened air, maintaining of a moist atmosphere within the storage or reservoir chambers, agitation of the seed cotton and the like.

Various changes and modifications may be made within the process of this invention as will be readily apparent to those skilled in the art. Such changes and modifications are within the scope and teaching of this invention as defined by the claims appended hereto.

What is claimed is:

1. That improvement in the process of ginning cotton by passage at high speed through the cleaning and drying equipment and then through the ginning equipment of a cotton ginning plant all in a substantially continuous high speed cotton stream which comprises: diverting the cotton from the said high speed passage after it has been dried and at least partially cleaned and prior to its entry into the ginning equipment, applying moisture to the diverted cotton, then delaying the passage of the moistened cotton into the ginning equipment for a period of at least about five minutes to effect a moisture regain in the cotton, and thereafter directing the cotton to the ginning equipment.

2. In the processing of cotton from uncleaned field condition to cleaned, ginned condition through high speed cleaning and ginning machinery in a substantially continuous high speed stream through said machinery: controlling the moisture content of the cotton in the cleaning and ginning stages including providing the cleaning stage with relatively dry cotton fibers and the ginning stage with relatively moist cotton, the transition between relatively dry to relatively moist cotton including the steps of diverting the cotton from the high speed machinery, adding water to the cotton fiber surfaces and allowing at least about five minutes time for the fibers to absorb the moisture into their internal cellular structure, and thereafter directing the cotton to the high speed machinery.

3. A process using high speed cotton cleaning and ginning machinery through which cotton passes and wherein it is first cleaned and subsequently ginned, all in a substantially continuous cotton stream comprising the steps of: introducing cotton into the high speed machinery, causing it to pass through substantially all the cleaning parts thereof and to emit therefrom in a steady high-speed stream, diverting the cotton from the high speed machinery, adding moisture to the cotton, delaying the return of the cotton to the high speed machinery for at least about five minutes, and producing absorption of the moisture into the fibers, and thereafter directing the cotton to the machinery and reestablishing its high speed stream for high speed ginning.

4. A method of processing cotton which comprises the steps of continuously introducing cotton into high speed cotton processing machinery which includes cotton cleaning machinery and cotton ginning machinery for performing cleaning and ginning operations, the steps of: introducing a dwell period in the flow of cotton through the machinery at a point between the cleaning and ginning operations, moisturizing the cotton early enough to provide a dwell of at least about five minutes of the moistened cotton, and continuously operating the cleaning and ginning machinery upon a substantially continuous stream of cotton between the cleaning and ginning machinery after the initial dwell period has elapsed.

5. In a process of treating seed cotton, the steps of: at least partially cleaning cotton; moistening the cotton after the step of at least partially cleaning it is completed; causing it to emit from the said cleaning step at a high speed; introducing it at said high speed into a moisture-absorbing stage and therein retaining it and causing it to dwell in said stage for a period of at least about five minutes during which it absorbs moisture internally into its fibers; then withdrawing it from the moisture-absorbing stage and introducing it into a ginning stage at the speed at which it was emitted from the cleaning step; thereby providing a substantially continuous stream of cotton between the cleaning and ginning machinery.

6. In a process of treating cotton in a substantially continuous high-speed stream, the steps of: cleaning cotton in a dried condition in a high speed stream; applying moisture to the cotton; holding the cotton thus moistened for a dwell period of at least about five minutes after application of the moisture to enable the moisture to become absorbed into the cotton fibers; then interposing the cotton again into the high-speed stream and ginning it.

References Cited in the file of this patent

UNITED STATES PATENTS

| | | |
|---|---|---|
| 227,767 | Groom | May 18, 1880 |
| 2,019,079 | Herring | Oct. 29, 1935 |
| 2,747,234 | Speakes et al. | May 29, 1956 |
| 2,764,013 | Harrell | Sept. 25, 1956 |